(12) United States Patent
Wolbank et al.

(10) Patent No.: US 11,594,989 B2
(45) Date of Patent: Feb. 28, 2023

(54) METHOD FOR REGULATING AN ELECTRIC ROTARY CURRENT MACHINE, AND ROTARY CURRENT MACHINE SYSTEM FOR SUCH A METHOD

(71) Applicants: BOMBARDIER TRANSPORTATION GMBH, Berlin (DE); TECHNISCHE UNIVERSITÄT WIEN, Vienna (AT)

(72) Inventors: Thomas Wolbank, Vienna (AT); Markus Vogelsberger, Trins (AT); Martin Bazant, Maennedorf (CH)

(73) Assignees: Bombardier Transportation GmbH; TECHNISCHE UNIVERSITÄT WIEN

( * ) Notice: Subject to any disclaimer, the term of this patent is extended or adjusted under 35 U.S.C. 154(b) by 0 days.

(21) Appl. No.: 17/351,965

(22) Filed: Jun. 18, 2021

(65) Prior Publication Data

US 2021/0399661 A1    Dec. 23, 2021

(30) Foreign Application Priority Data

Jun. 22, 2020    (EP) ..................................... 20181490

(51) Int. Cl.
*H02P 21/09*    (2016.01)
(52) U.S. Cl.
CPC .......... *H02P 21/09* (2016.02); *H02P 2207/01* (2013.01)
(58) Field of Classification Search
CPC .............................. H02P 21/09; H02P 2207/01
See application file for complete search history.

(56) References Cited

U.S. PATENT DOCUMENTS

| | | | |
|---|---|---|---|
| 9,871,418 B2 * | 1/2018 | Huh | H02K 29/12 |
| 2019/0145668 A1 * | 5/2019 | Takahashi | G05B 11/38 |
| | | | 62/115 |

FOREIGN PATENT DOCUMENTS

WO    9939430 A1    8/1999

OTHER PUBLICATIONS

Wolbank et al., Comparison of inherent saliency tracking methods for zero speeds sensorless control of standard induction machines, Department of Electric drives and MAchines, Vienna University of Technology, pp. 1258-1263.*
Wolbank, T. M., et al; "Comparison of Inherent Saliency Tracking Methods for Zero Speed Sensorless Control of Standard Induction Machines"; 2009 IEEE International Electric Machines and Drives Conference; Miami, FL; May 3, 2009; 6 Pages.
(Continued)

*Primary Examiner* — Zoheb S Imtiaz
(74) *Attorney, Agent, or Firm* — Husch Blackwell LLP

(57) ABSTRACT

A rotary current machine system and method for controlling an electric rotary current machine, in particular an induction machine, having a rotor, a stator and at least two phase windings is disclosed. At least one electrical signal, in particular a voltage signal, is applied to at least one phase winding, preferably all phase windings, of the rotary current machine, and the current waveform in the at least one phase winding is measured. An intermodulation signal component, induced in the rotary current machine by slotting effects and magnetic saturation effects, which is determined from the current waveform measured in the at least one phase winding, is used for controlling the rotary current machine.

20 Claims, 14 Drawing Sheets

(56) References Cited

OTHER PUBLICATIONS

Brown, Ian P., et al.; "Induction Machine Design Methodology for Self-Sensing: Balancing Saliencies and Power Conversion Properties"; IEEE Transactions on Industry Applications, vol. 47, No. 1; Jan. 19, 2011; 9 Pages.

Fahrner, Walter, et al.; "Identification and Compensation of High-Order Harmonic Distortions in Saliency Based Sensorless Control of Induction Machines"; IECON 2017, 43rd Annual Conference of the IEEE Industrial Electronics Society; Beijing, China; Oct. 29, 2017; 7 Pages.

Metwaly, Mohamed K., et al; "Slotting Saliency Extraction For Sensorless Torque Control of Standard Induction Machines"; IEEE Transactions on Energy Conversion, vol. 33, No. 1; Mar. 1, 2018; 10 Pages.

Extended European Search Report; Application No. 20181490.2; Completed: Dec. 3, 2020; dated Dec. 11, 2020; 9 Pages.

\* cited by examiner

METHOD FOR REGULATING AN ELECTRIC ROTARY CURRENT MACHINE, AND ROTARY CURRENT MACHINE SYSTEM FOR SUCH A METHOD

TECHNICAL FIELD

The present teaching relates to a method for controlling an electric rotary current machine, in particular an induction machine, with a rotor, a stator and at least two phase windings, wherein at least one electrical signal, in particular a voltage signal, is applied to at least one phase winding, preferably all phase windings, of the rotary current machine and an electrical signal waveform, in particular a current waveform, is measured or determined in the at least one phase winding. The present teaching further relates to a rotary current machine system for executing such a method.

BACKGROUND

In modern control methods for rotary current machines, it is often necessary to know the angular position of the rotor. To obtain this information, sensors such as incremental rotary encoders, absolute rotary encoders or resolvers can be used, which can be based on a wide variety of physical principles. The disadvantage of all types of rotary encoders, however, is the additional costs. In addition, rotary encoders have a limited-service life, which is often less than the planned service life of the rotary current machine. A suspected failure of a three-phase drive is often due to the failure of such a sensor. However, failures and downtimes, for example of faulty trains on railway lines, can involve considerable effort and high costs and should therefore be avoided where possible.

In order to avoid the use of such sensors in rotary current machines or three-phase drives, so-called sensorless control methods were developed in which the angular position of the flow chain can be determined from the waveforms of the electrical variables in the rotary current machine without the use of a sensor for the angle or the rotation speed of the rotor. In these procedures, excitation signals are often applied by means of a converter and the response signals of the machine are measured as a consequence of the excitation signals. By means of an appropriate evaluation, the angular position or the rotation speed of the rotor can be determined.

Sensorless control methods use the fact that rotary current machines exhibit asymmetries caused by their design or during operation as a result of electrical or magnetic effects, which can change over time and in location. The changes in the asymmetries usually cause changes in inductance and can therefore be detected, for example, by a change in the current rise. Document WO 99/39430 A1 describes a sensorless control method.

An example of a design-related asymmetry is the rotor of a permanent-magnet-excited synchronous machine (PSM), which has permanent magnets at certain positions, which have a lower relative permeability than the surrounding areas that have iron and therefore increase the magnetic resistance in the area of the permanent magnets relative to the areas with iron. As the rotor of the PSM rotates, the magnetic resistance along the circumference of the air gap is varied with time and position, which manifests itself in changes in inductance.

Examples of electrical or magnetic asymmetry are local saturation phenomena of the magnetic flux paths in the rotary current machine.

The weaker the rotor-related asymmetries of a rotary current machine are, the more difficult it is to detect a change in the rotation angle of a rotor without sensors. It is particularly difficult to determine the angular position of a rotor of an induction machine without sensors (i.e., without sensors of the type described above, such as incremental rotary encoders), because induction machines, especially in comparison to synchronous machines, have lower asymmetries. In asynchronous machines, a slot signal component contained in the measured current waveforms is usually isolated from other signal components and evaluated, or the saturation signal is used. The slot signal component is caused by the rotation of the rotor slot past the stator slot and the associated inductance change. Since the inductance changes caused by the passing slot are relatively small, the slot signal component is usually small and can therefore, depending on the operating state and design of the induction machine, be difficult to identify and separate from other signal components. In particular with increasing load on the induction machine, it is difficult or impossible to distinguish the slot signal component from other signal components.

SUMMARY

In light of these comments, one object of the present teaching is to alleviate or even completely eliminate the disadvantages of the prior art. In particular, one object of the present teaching is to provide a method of the kind mentioned above, in which an angular position and/or a rotation speed of a rotor of a rotary current machine, in particular an induction machine, can be determined from the at least one electrical signal waveform in an improved manner and over a wide range of rotation speeds and loads.

This object is achieved by a method having the features of the present teachings. According to the present teaching, it is therefore provided that in a method of the type mentioned above, an intermodulation signal component induced in the rotary current machine by slotting and magnetic saturation effects, which is determined from the electrical signal waveform measured or determined in the at least one phase winding, is used to control the rotary current machine. The intermodulation signal component can be used in particular to determine the rotor position, i.e., the angular position of the rotor, which can subsequently be used for controlling the rotary current machine. Preferably, at least one electric current waveform is measured or determined and used as the electrical signal waveform. For this reason, the following comments refer to measured current waveforms. Measured or determined voltage waveforms can also be used, however. The determination of the signal waveform, in particular of a current waveform, in the at least one phase winding of the rotary current machine can be carried out, for example, by measuring currents and/or voltages in a DC link (intermediate circuit) of the converter, in a power supply of the converter or in an infeed of a converter on the machine side. In particular, phase currents of the rotary current machine can be determined on the basis of an intermediate circuit current. Since the method is particularly suitable for use in induction machines or electrical machines with an at least partial asynchronous machine-like character (for example, synchronous machines with a damper cage), the following comments primarily refer to induction machines. In a preferred embodiment the electric rotary current machine can have two, three or more than three-phase windings. The electric rotary current machine is preferably a three-phase machine. The present teaching is based on the finding that, as further explained below, a mathematical or physical relationship exists between the intermodulation signal component and the slot signal component representative of the angular position or rotation speed of the rotor and therefore a control- and position-signal can be derived from the intermodulation signal component and used for controlling the rotary current machine. Thus, the slot signal component, which is often difficult to determine, no longer has to be used directly. The intermodulation signal component in the signal response of the rotary current machine in response to an excitation signal is significantly greater than the slot signal component in most of the rotary current machine operating states and can therefore be more easily identified and separated from other signal components. The intermodulation signal component can be evaluated in the time domain and/or in the frequency domain. In particular, an angular position and/or a rotation speed of the rotor can subsequently be determined from the intermodulation signal component. For this purpose, a saturation signal component can also be used and correlated with the intermodulation signal component (see below). The intermodulation signal component is mainly caused by effects of the slot of the rotor or the stator of the rotary current machine and by effects of the magnetic saturation of magnetic flux paths within the rotary current machine. In most operating states, the intermodulation signal component has a different fundamental frequency than the slot signal component and the saturation signal component. The described effects in turn cause separate signal components, which are also contained in the at least one measured current waveform. The signal components generated by the slotting of the rotor and of the stator of the rotary current machine in the current waveform are called slot signal components. The fundamental frequency of the slot signal components normally corresponds essentially to N times the rotation frequency of the rotor, where N corresponds to the number of slots of the rotor. The signal components induced in the current waveform caused by temporal and local variation of the magnetic saturation of magnetic flux paths within the rotary current machine are called saturation signal components. The fundamental frequency of the saturation signal component normally corresponds essentially to twice the fundamental- or operating-period of the machine. By physically combining the two effects mentioned above, their signal components in the rotary current machine are also combined, thereby generating the intermodulation signal component, the frequencies of which are different from the frequencies of the saturation signal component and the frequencies of the slot signal component in most operating states (intermodulation). The effect of the described intermodulation occurs in particular in asynchronous machines and electrical machines with at least partially asynchronous-machine-like character, which is why the method according to the present teaching is particularly suitable for controlling asynchronous machines. In previous applications known from the prior art, the intermodulation signal component in the response of the machine to an excitation signal was considered as an interfering component and eliminated. As already mentioned, the present teaching is based on the finding that a correlation exists between the intermodulation signal component and the slot signal component that is representative of the angular position and rotation speed of the rotor, and the intermodulation signal is therefore also suitable for controlling the rotary current machine. The relationship between the frequencies of the intermodulation signal component, the slot signal component, and the saturation signal component is:

$$\omega_{inter} = \pm \omega_{sat} - \omega_{slot}, \tag{1}$$

where $\omega_{inter}$ is the frequency of the intermodulation signal component, $\omega_{sat}$ is the frequency of the saturation signal component, and $\omega_{slot}$ is the frequency of the slot signal component. The sign of $\omega_{sat}$ in equation (1) depends on the construction and design of the rotary current machine. In order to recover the slot signal component from the intermodulation signal component by calculation, the saturation signal component, preferably its fundamental frequency, can be used in particular. The saturation signal component can be determined from the currents in the phase windings of the rotary current machine. In addition to the fundamental frequencies, the signal components mentioned can also have harmonics, but these will be ignored in the interests of a simplified explanation and due to their minor influence. The present teaching is additionally based on the finding that the correlation between the intermodulation signal component and the slot signal component can be used to determine an angular position and/or a rotation speed of the rotor from the intermodulation signal component without having to determine or use the slot signal component directly from the current waveform. The intermodulation signal component can therefore advantageously be used in all control methods in which knowledge of the angular position of the rotor or the angular position of the flow chain is necessary. In contrast to the present teaching, in the prior art the intermodulation signal is usually eliminated as an interference signal and the slot signal component, or the saturation signal component is used directly for the controlling.

It is particularly advantageous if electrical signals, in particular voltage signals, are applied to all phase windings of the rotary current machine and the resultant current waveform of each phase winding is determined, in particular measured, evaluated and used to determine the intermodulation signal component. The applied electrical signals can contain excitation signals in particular. The response of the machine to the excitation signals allows information to be obtained as to the operating state of the machine so that the intermodulation signal component can be determined. Different types and shapes of excitation signals may be provided. The excitation signals can be, for example, voltage signals which are applied (anyway) to generate the rotating field in the air gap. The excitation signals can be the result of switching operations of the power semiconductors of a converter, such as the PWM (pulse-width modulation) or similar methods. With the switching operations, the converter generates the rotating field in the air gap. Thus, the excitation signals can be integrated into the rotating field excitation. For example, the carrier frequency of the PWM or its harmonics can also be considered and used as an excitation signal. Thus, parts of the switching sequence are used for operating the rotary current machine and their current waveforms are determined and evaluated. The excitation signals can also be excitation signals or test signals independent of the switching sequence for generating the rotating field of the rotary current machine, which are applied between the switching sequences for generating the rotating field in the air gap and/or superimposed on them. Rectangular pulses are preferably used as excitation signals since they can be easily generated using a converter. The excitation signals can also be sinusoidal, transient, pulsed and/or rotating, for example. The excitation signals can also be PWM-modulated themselves. The only important point is that a machine response to an excitation signal (e.g., a current waveform) can be determined, which allows conclusions to be drawn about the previously mentioned changing asymmetries of the rotary current machine. Preferably, when applying excitation signals that are not part of the switching sequence for operating the rotary current machine, i.e., are not used to generate the rotating magnetic field, the frequency of the excitation signals is selected in such a way that they have no or only minimal influence on the generated rotating field, or on the torque, in the air gap.

In a preferred embodiment it is provided that an angular position and/or a rotation speed of the rotor is determined from the intermodulation signal component and the angular position and/or the rotation speed is used to control the rotary current machine. For example, the rotation speed can be determined using the formula (1). In the determination of the angular position and/or the rotation speed therefore, a saturation signal component, in particular its angle or an angle representative of it, can therefore be used. In one embodiment, by integrating the angular velocity $\omega_{slot}$, it is possible to recover the angular position of the rotor by reverse calculation. The angular position can be used in particular to represent the physical, in particular electrical, quantities required for regulation in a control method.

Preferably, the intermodulation signal component is determined from the at least one temporal current waveform, in particular from its rate of change. A corresponding rate of change can also be determined by means of a mathematical equation after a possible combination of multiple current waveforms of different phases.

A further embodiment provides that in at least two phase windings, in particular in three phase windings, of the rotary current machine, current waveforms, in particular their rates of change, are determined and the current waveforms, preferably their rates of change, are combined by means of a mathematical equation, in particular an equation for calculating a space vector, to form a combined signal and the intermodulation signal component is determined from the combined signal. The measured current waveforms are preferably discrete time signals. The measured current waveforms can also be time-continuous signals, however. Instead of current waveforms, voltage waveforms can also be used.

When determining the internal states of the rotary current machine, due to the electrical relationship:

$$u(t) = L \frac{di(t)}{dt} \quad (2)$$

it is convenient if the rates of change of the current waveforms are combined by the mathematical equation or after the combination a rate of change of the combined signal is determined, since the asymmetries that allow an evaluation of the angular position or rotation speed of the rotor can be determined in particular by changes in inductance and the inductance L is related to the voltage u(t) by the rate of change of the current di(t)/dt. If the applied electrical signal is an essentially sinusoidal voltage signal, the measured current values, in particular amplitude or RMS values, can also be essentially used and combined directly, since based on the complex AC calculation the relationship according to equation (2) simplifies to:

$$U(t)=j\omega LI(t) \quad (3)$$

where U again means a voltage, j means the imaginary unit, w an angular velocity/frequency, L an inductance and I a current. As an equation for relating the current waveforms, in particular their rates of change, an equation for calculating a space vector, such as:

$$\vartheta_{saliency} = i_U(t) + i_V(t)e^{j2\frac{\pi}{3}} + i_W(t)e^{j4\frac{\pi}{3}} \quad (4a)$$

or $$\vartheta_{saliency} = \frac{di_U(t)}{dt} + \frac{di_V(t)}{dt}e^{j2\frac{\pi}{3}} + \frac{di_W(t)}{dt}e^{j4\frac{\pi}{3}} \quad (4b)$$

can be used, where $i_{U,V,W}(t)$ means a current waveform (or $di_{U,V,W}(t)/dt$ its first temporal derivative) in a phase winding U, V, W of the rotary current machine, j means the imaginary unit, e means the Euler number and $\pi$ means the circle constant. In this case, the combined signal $\vartheta_{Saliency}$ is a complex vector, equivalent to a space vector. A space vector is used to map physical quantities, in particular quantities of a multi-phase system, in the complex plane with real and imaginary parts. The intermodulation signal can then be determined from the combined signal.

In one embodiment it is provided that the intermodulation signal component is extracted by eliminating other signal components, preferably by eliminating saturation signal components due to magnetic saturation effects and/or slot signal components due to slotting effects in the rotary current machine, preferably from the combined signal. In other words, the intermodulation signal component is isolated. Additional signal components can also be eliminated. The elimination of signal components other than those of the intermodulation signal component can be carried out by filtering, for example. Elimination can also be carried out by subtracting the unwanted signal components. For example, the unwanted signal components in frequency, amplitude and phase can be estimated and subtracted from the current waveform or the associated current signal. This can be carried out, for example, by prior identification of the machine and by using a cost function, such as those described in "Identification and Compensation of High-order Harmonic Distortions in Saliency Based Sensorless Control of Induction Machines" by W. Fahrner, M. A. Vogelsberger and T. Wolbank, or in "Induction Machine Design Methodology for Self-Sensing: Balancing Saliencies and Power Conversion Properties." by Brown, Ian Paterson and Robert D. Lorenz.

In one embodiment it is provided that slot information, in particular a slot angle, is determined from an angle of the intermodulation signal component by combining the angle of the intermodulation signal component with an angle of a saturation signal component contained in the current waveform, for example by means of the calculation rule:

$$\theta_{slot}(t)=-\theta_{inter}(t)\pm\theta_{sat}(t) \quad (5)$$

where $\theta_{slot}(t)$ corresponds to the calculated slot angle, $\theta_{inter}(t)$ to the angle of the intermodulation signal component, and $\theta_{sat}(t)$ to the angle of the saturation signal component. The slot angle $\theta_{slot}(t)$ determined in this way essentially corresponds to the angle of the slot signal component. In other words, by combining the angle $\theta_{inter}(t)$ of the intermodulation signal component and the angle $\theta_{sat}(t)$ of the saturation signal component, the slot angle $\theta_{slot}(t)$ is determined or computed. The angles $\theta_{slot}(t)$, $\theta_{inter}(t)$ and $\theta_{sat}(t)$ can be phase angles, in particular phase angles of the fundamental frequencies of the individual effects. The angle $\theta_{sat}(t)$ of the saturation signal component can be determined by doubling the angle of the stator current, wherein a load-dependent offset value can be provided for correction.

The offset value can be determined, for example, by means of a cost function derived from measurements on the rotary current machine.

To calculate the mechanical rotor angle position, in one embodiment it can be provided that a mechanical angular position of the rotor is determined by dividing the slot angle by a number of slots of the rotor. Preferably, the number of slots corresponds to the total number of slots of the rotor.

In the course of experiments with the method according to the present teaching it has been found that the angle of the intermodulation signal component can exhibit a deviation as a function of the rotation speed and/or the loading of the rotary current machine, so that an angular position of the rotor determined from the intermodulation signal component can deviate from the actual angular position. For this reason, it may be advantageous, for example, to correct the angle of the intermodulation signal component as a function of the load, in particular the torque, and/or the rotation speed of the rotary current machine, using an intermodulation correction value. The intermodulation correction value can be determined before the method is applied, for example by taking measurements on the machine or by calculations, and stored in a table, for example, or modelled by a mathematical function.

In addition, the experiments have shown that the angle of the saturation signal component can also show a deviation as a function of the rotation speed and/or the loading of the rotary current machine. For this reason, it may be provided that the angle of the saturation signal component is corrected as a function of the load, in particular the torque, and/or the rotation speed of the rotary current machine using a saturation correction value. The saturation correction value can be determined before the method is applied, for example by taking measurements on the machine or by calculations, and stored in a table, for example, or modelled by a mathematical function.

In one embodiment it can be provided that the electrical signal applied to the rotary current machine has an excitation signal that is essentially independent of the fundamental component of the rotary current machine's rotating field, the temporal fundamental frequency of which is preferably at least five times as high, more preferably at least ten times as high, as the temporal frequency of the fundamental frequencies of the voltages in the phase windings (U,V,W) for generating the rotating field of the rotary current machine. Preferably, the excitation Signal is a voltage signal. In a further embodiment, the fundamental frequency of the excitation signal is at least twice the operational slip frequency of an induction machine. The excitation signal can also be generated from a sequence of essentially rectangular voltage pulses (step functions), which can be formed both by individual switching operations of the converter and by a combination of multiple individual pulses with temporally step-shaped and/or different duty cycles.

In one embodiment it is provided that the electrical excitation signal is a current signal and that the response of the rotary current machine, in particular the voltage at the rotary current machine, is evaluated to determine the inter-modulation signal component.

The above object is also achieved by a rotary current machine system. The three-phase system comprises:
- a rotary current machine, in particular an induction machine, with a rotor, a stator and at least two phase windings;
- a power unit, in particular a converter, which is electrically connected to the rotary current machine, in which the power unit is configured to apply excitation signals, in particular voltage signals or current signals, to at least one phase winding, preferably all phase windings, of the rotary current machine;
- at least one measuring device which is configured to measure or determine a temporal waveform of the response of the machine, in particular a current waveform or a voltage waveform, in the at least one phase winding or in a DC link of the converter or in the power supply for the converter or in the infeed of a converter on the machine side,
- a control unit that is configured to control the rotary current machine on the basis of an intermodulation signal component induced by slotting and magnetic saturation effects in the rotary current machine, which intermodulation signal component is contained in the at least one measured current waveform, in particular in its rate of change.

The rotary current machine system is configured to carry out the method described above. For the advantages, technical effects and other features, reference is therefore made to the method described above. The power unit can generate excitation signals by means of switching operations. For this purpose, the power unit can comprise a multiplicity of electrical switches, such as semiconductor switches. The measuring device can comprise at least one current or voltage measuring sensor. Preferably, the measuring device can be used to determine the current waveforms in all phases of the rotary current machine. For this purpose, a current measuring sensor can be provided in each phase winding of the rotary current machine. For m phase windings, a current measuring sensor can also be provided in only m−1 phase windings and the current of the m-th phase winding can be calculated using the nodal rule.

The phase currents of the rotary current machine can also be determined or calculated by measurement in the DC link of the converter, in the power supply of the converter, or in the infeed of the converter on the machine side.

For example, the control unit may be a stand-alone unit or part of another unit, in particular a microprocessor. The control unit can be integrated in the converter. The phase windings of the rotary current machine form coils or are connected to coils that can generate a magnetic flux in the air gap between the rotor and stator of the rotary current machine.

BRIEF DESCRIPTION OF THE DRAWINGS

In the following, the present teaching is described by reference to the figures, but is not intended to be limited thereby.

DETAILED DESCRIPTION

In the following the method according to the present teaching is explained in further detail based on an application to an induction machine.

Figure 1:
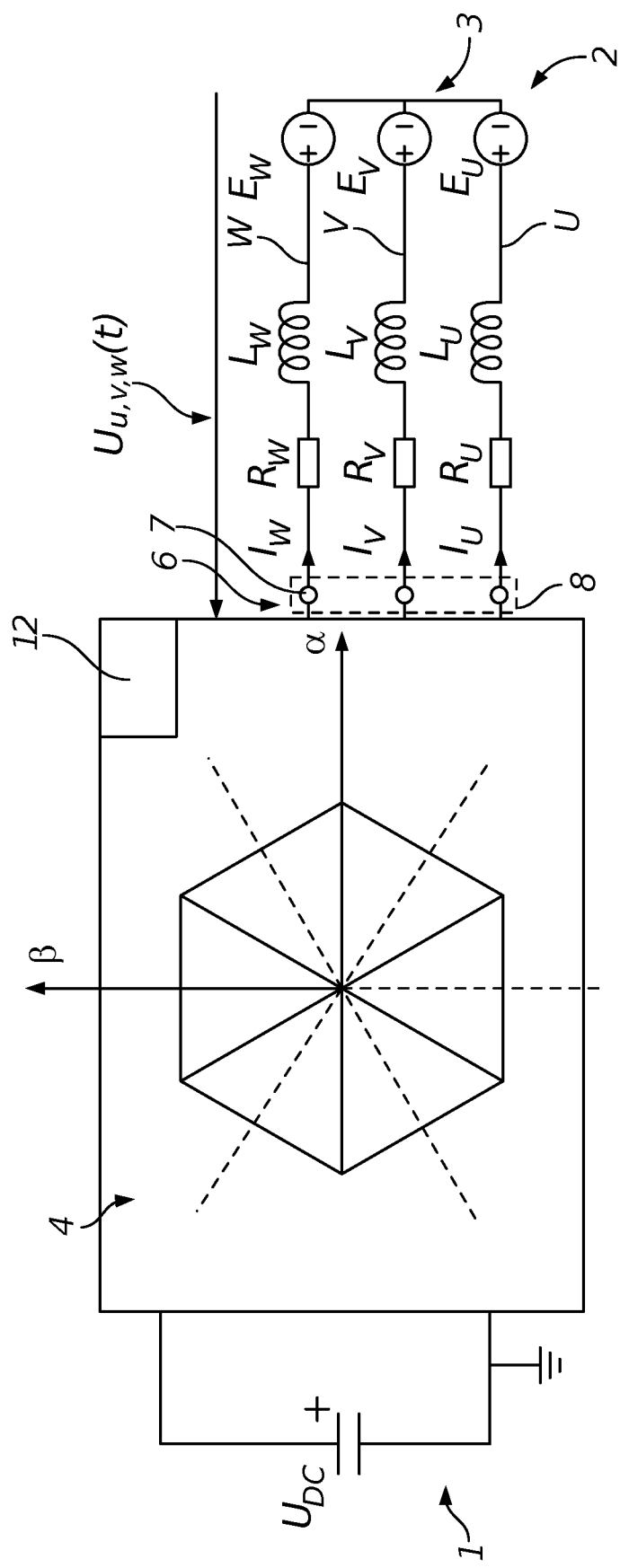
FIG. 1 shows a schematic view of a rotary current machine system with a converter and a rotary current machine.

FIG. 1 shows a schematic view of a rotary current machine system 1 with a rotary current machine 3 designed as an induction machine 2 driven by a converter 4, which has a multiplicity of electronic switches (not shown), for example semiconductor switches. The converter 4 is configured to output voltages with predefined frequencies, amplitudes and (zero) phase angles at an output 6 by means of appropriate switching operations. The output 6 of the converter 4 is connected to the phase windings U, V, W of the induction machine 2. Due to the generated voltages of the converter 4, a rotating magnetic field is generated in an air gap of the induction machine 2 between rotor 21 and stator 20 (see FIG. 2), which induces voltages in the rotor 21 of the induction machine 2 and sets the rotor into rotation due to the resulting rotor currents.

The induction machine 2 is shown schematically in FIG. 1 as a circuit diagram. The induction machine 2 has three phase windings U, V, W with a phase winding resistance $R_U$, $R_V$, $R_W$ and a phase winding inductance $L_U$, $L_V$, $L_W$ respectively. The voltages $E_U$, $E_V$, $E_W$ denote the voltages (back EMF) induced in the stator 20 of the induction machine 2. The currents $I_U$, $I_V$, $I_W$ flowing in the phase windings U, V, W can be measured or determined using current measuring sensors 7a and/or 7b of a measuring device 8a or 8b respectively. Phase currents can also be determined using the current measuring sensors 7b, for example on the basis of a current flowing into the converter 4. It may be the case that a current measuring sensor 7a is provided in each phase winding U, V, W. The current measuring sensors 7a or 7b can be integrated into the converter 4 or can be independent elements. With the aid of current measuring sensors 7a and/or 7b, the time-domain current waveforms $i_U(t)$, $i_V(t)$, $i_W(t)$ of the currents $I_U$, $I_V$, $I_W$ in the phase windings U, V, W can be determined.

Figure 2:
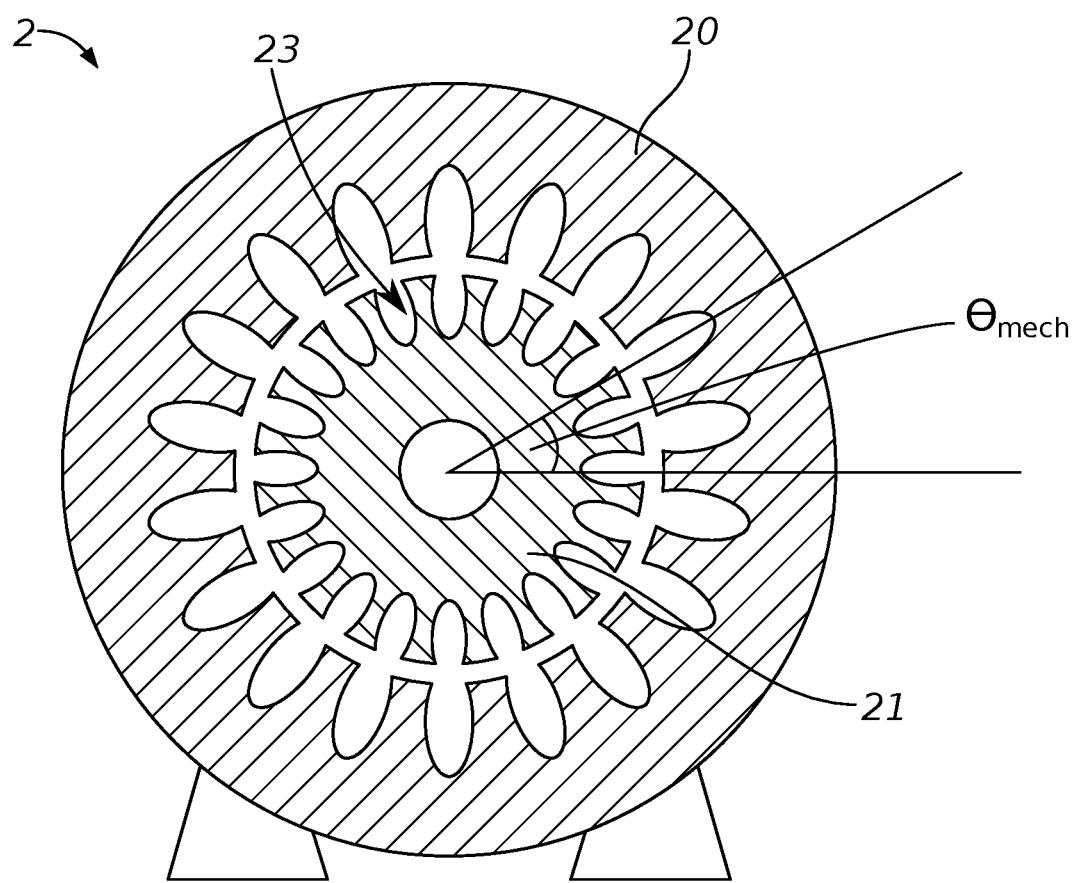
FIG. 2 shows an induction machine in cross-section.

FIG. 2 shows schematically an induction machine 2 without windings in cross-section with a stator 20, a rotor 21 and a slot 23, on each of the rotor 21 and stator 20. For illustration, an angular position $\theta_{mech}(t)$ of the rotor 21 is indicated.

As mentioned above, the induction machine 2 shows asymmetries which can vary according to time and location, thus allowing information to be obtained on the angular position $\theta_{mech}(t)$ and/or the rotation speed of the rotor 21. An example of such an asymmetry is the slotting 23 of rotor 21 and/or stator 20. Another example of an asymmetry is the saturation of the magnetic flux paths in the induction machine 2. Both asymmetries cause temporal and spatial inductance changes in the operation of the induction machine 2, which can be determined by evaluating the current waveforms $i_U(t)$, $i_V(t)$, $i_W(t)$. For example, in a greatly simplified model to illustrate an asymmetry, it can be assumed, for example, that the three phase winding inductances $L_U$, $L_V$, $L_W$ in the phase windings U, V, W each have a mean value Lo and, as a function of a mechanical angular position $\theta_{mech}(t)$ of the rotor 21, deviate from this mean value Lo sinusoidally (with an amplitude Lim):

$$L_U(\theta_{mech}(t)) = L_{U,0} + L_{U,M}\sin(\theta_{mech}(t)) \quad (6A)$$

$$L_V(\theta_{mech}(t)) = L_{V,0} + L_{V,M}\sin\left(\theta_{mech}(t) + \frac{2\pi}{3}\right) \quad (6B)$$

$$L_W(\theta_{mech}(t)) = L_{W,0} + L_{W,M}\sin\left(\theta_{mech}(t) + \frac{4\pi}{3}\right). \quad (6C)$$

The change in the angular position $\theta_{mech}(t)$ of the rotor 21 therefore also changes the inductances $L_U$, $L_V$, $L_W$. The variable inductance components can therefore also be referred to as modulated inductances. The changes in inductances $L_U$, $L_V$, $L_W$ can be caused, for example, by the slot 23 of the rotor 21 or stator 20 and/or the magnetic saturation of magnetic iron paths in the rotary current machine 3.

The determination of the angular position $\theta_{mech}(t)$ of the rotor 21 for induction machines 2 has up to now presented a major challenge, since induction machines 2, particularly in comparison to most synchronous machines, have significantly smaller asymmetries and thus significantly smaller inductance fluctuations in operation.

To determine inductance changes, electrical signals, preferably voltage signals $U_U(t)$, $U_V(t)$, $U_W(t)$, are applied to the phase windings U, V, W of the induction machine 2 and the resulting current waveforms $i_U(t)$, $i_V(t)$, $i_W(t)$ are measured using the current measuring sensors 7. The voltages or voltage pulses applied by the converter 4 to operate the induction machine 2 can be used as voltage signals $U_U(t)$, $U_V(t)$, $U_W(t)$. The electrical signals can contain excitation signals 9 to determine the operating state of the rotary current machine 3. The excitation signals 9 can be essentially independent of the generation of a rotating field of the rotary current machine 3. Here, excitation signals 9 can be used which are applied between the voltage (pulses) generated by the converter 4 for generating the rotating field, or superimposed on them. It is also possible to use voltage waveforms with frequencies higher than that used to generate the fundamental component of the rotating field.

Figure 10C:
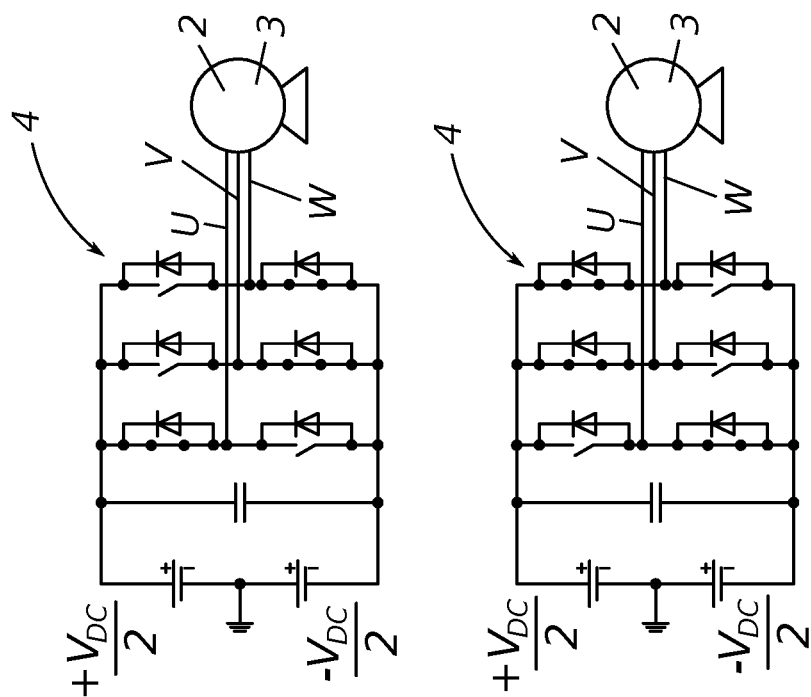
FIGS. 10A-10C illustrate excitation signals and resulting current waveforms.
Figure 10B:
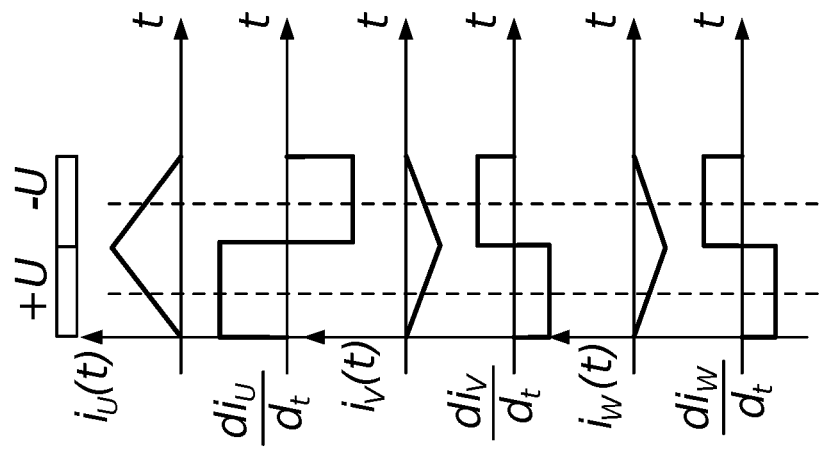
Figure 10A:
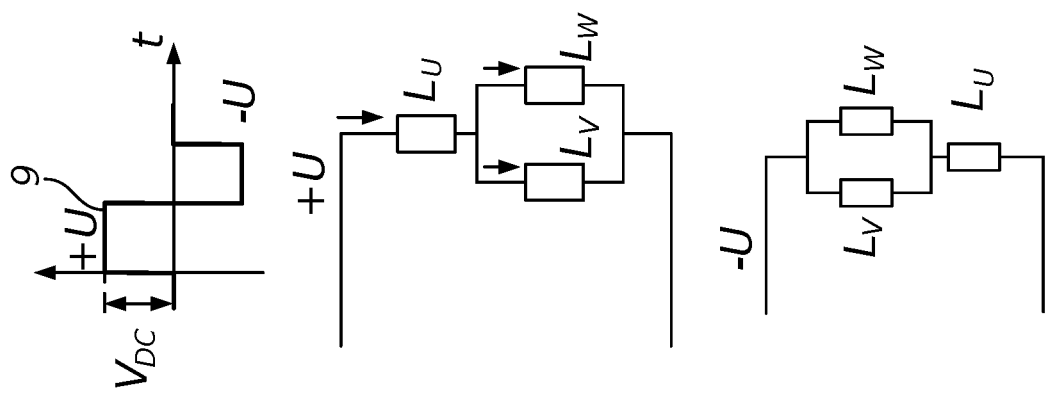

In FIG. 10A to FIG. 10C, the application of an example excitation signal 9 and the resultant current waveforms $i_U(t)$, $i_V(t)$, $i_W(t)$ in the phase windings U, V, W of a rotary current machine 3 are illustrated. Any ohmic resistances can be ignored here. FIGS. 10A-10C show two switch positions of the converter 4, with which a rectangular excitation signal 9 with a positive voltage +U and a negative voltage −U can be generated (amplitude $V_{DC}$). If such an excitation signal 9, which is shown against time t in the upper partial image of FIG. 10A, is applied, as shown in FIG. 10B, corresponding current increases $di_U/dt$, $di_V/dt$, $di_W/dt$ are obtained in the current waveforms $i_U(t)$, $i_V(t)$, $i_W(t)$. In FIG. 10B, current waveforms $i_U(t)$, $i_V(t)$, $i_W(t)$ and current slopes $di_U/dt$, $di_V/dt$, $di_W/dt$ of each phase winding U, V, W are shown. Electrical equivalent circuit diagrams of the induction machine 2 with applied voltages +U and −U of the excitation signal 9 are shown in the lower two images of FIG. 10A. If the excitation signal 9 is applied, with a positive voltage +U (with the electrical sign convention according to FIG. 1) a positive current slope $di_U/dt$ initially occurs in phase winding U (and thus a positive voltage drop across the phase winding inductance $L_U$) and a negative current slope $di_V/dt$ or $di_W/dt$ in each of the phase windings V and W (and thus a negative voltage drop across the phase winding inductances $L_V$ and $L_W$). With a negative voltage −U of the excitation signal 9, the case is reversed.

On account of different phase winding inductances $L_U$, $L_V$, $L_W$ due to asymmetries in the rotary current machine 3, an additional deviation of the current slopes $di_U/dt$, $di_V/dt$, $di_W/dt$ is obtained. This additional deviation is not shown in FIG. 10B, but can be seen in FIG. 3B.

Figure 3A:
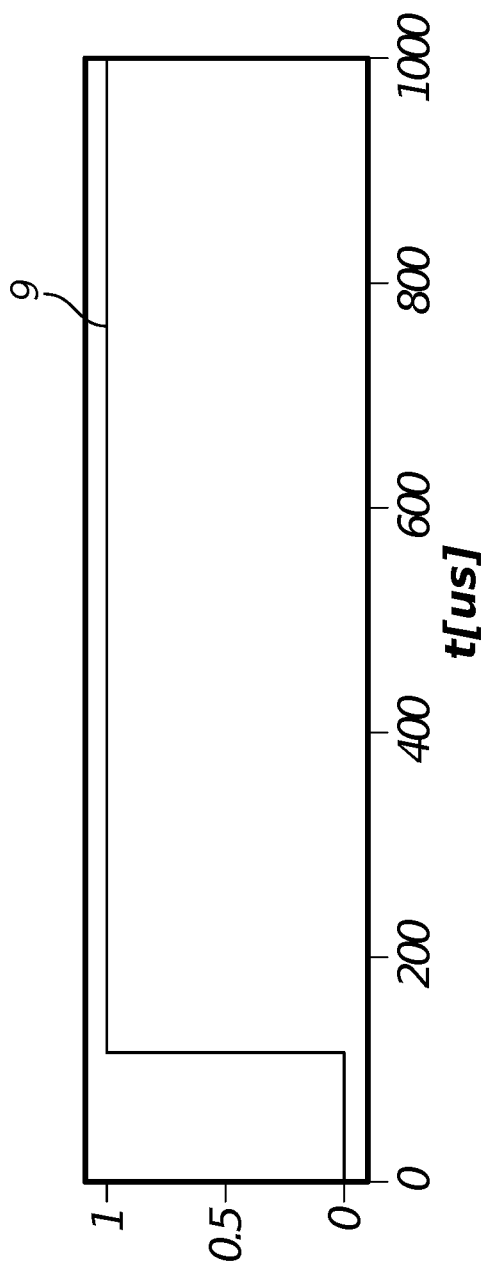
FIG. 3A shows a schematic view of an exemplary excitation signal.

In one embodiment, rectangular excitation signals 9, such as those shown in FIG. 3A, are applied to the phase windings U, V, W of the induction machine 2 for the determination of inductance. FIG. 3A shows the excitation signal 9 in normalized form. As a result of such an excitation signal 9, which can be applied, for example, between the voltage pulses applied to generate the rotating field in the induction machine 2, a current slope of $di_U/dt$, $di_V/dt$, $di_W/dt$ occurs in the phase windings U, V, W due to the relationship illustrated in equation (2). Any ohmic resistance can usually be ignored here.

Figure 3B:
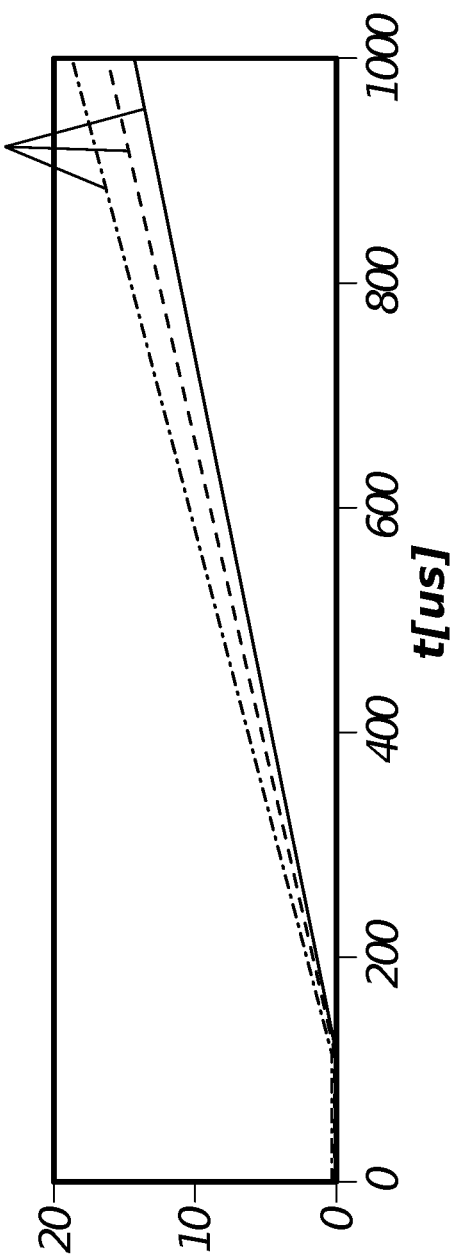
FIG. 3B shows schematic current waveforms in response to the excitation signal according to FIG. 3A (at different rotor positions)

In FIG. 3B, as an example, three different current slopes $di_U/dt$ of the phase current $I_U$ in phase winding U are shown at different times and thus for different phase winding inductances $L_U$ due to the asymmetries of the rotary current machine 3 (cf. equation 6A-6C). Similar illustrations also apply to the remaining phase windings V and W. The illustrations shown in the figures have been simplified and are intended to illustrate schematically the principle of the inductance determination. The variation in the current waveforms $i_U(t)$, $i_V(t)$, $i_W(t)$ over time allows information to be obtained about the change in the inductances $L_U$, $L_V$, $L_W$.

The current slopes $di_U/dt$, $di_V/dt$, $di_W/dt$ in the phase windings U, V and W, determined preferably at regular intervals, can then be combined using a mathematical equation into a combined signal $\vartheta_{Saliency}$. However, in particular in the case of sinusoidal excitation signals 9, the current values, i.e., the amplitudes, or RMS values, or instantaneous values, of the currents $I_U$, $I_V$, $I_W$ can also be used and combined. Preferably, a mathematical equation for calculating a space vector is used to combine the current waveforms, for example:

$$\vartheta_{saliency} = \frac{di_U(t)}{dt} + \frac{di_V(t)}{dt}e^{j2\frac{\pi}{3}} + \frac{di_W(t)}{dt}e^{j4\frac{\pi}{3}}. \quad (4b)$$

The combined signal $\vartheta_{Saliency}$ can also be called a "saliency signal". When the signal $\vartheta_{Saliency}$ is calculated as a space vector, $\vartheta_{Saliency}$ represents a tensor.

Figure 4A:
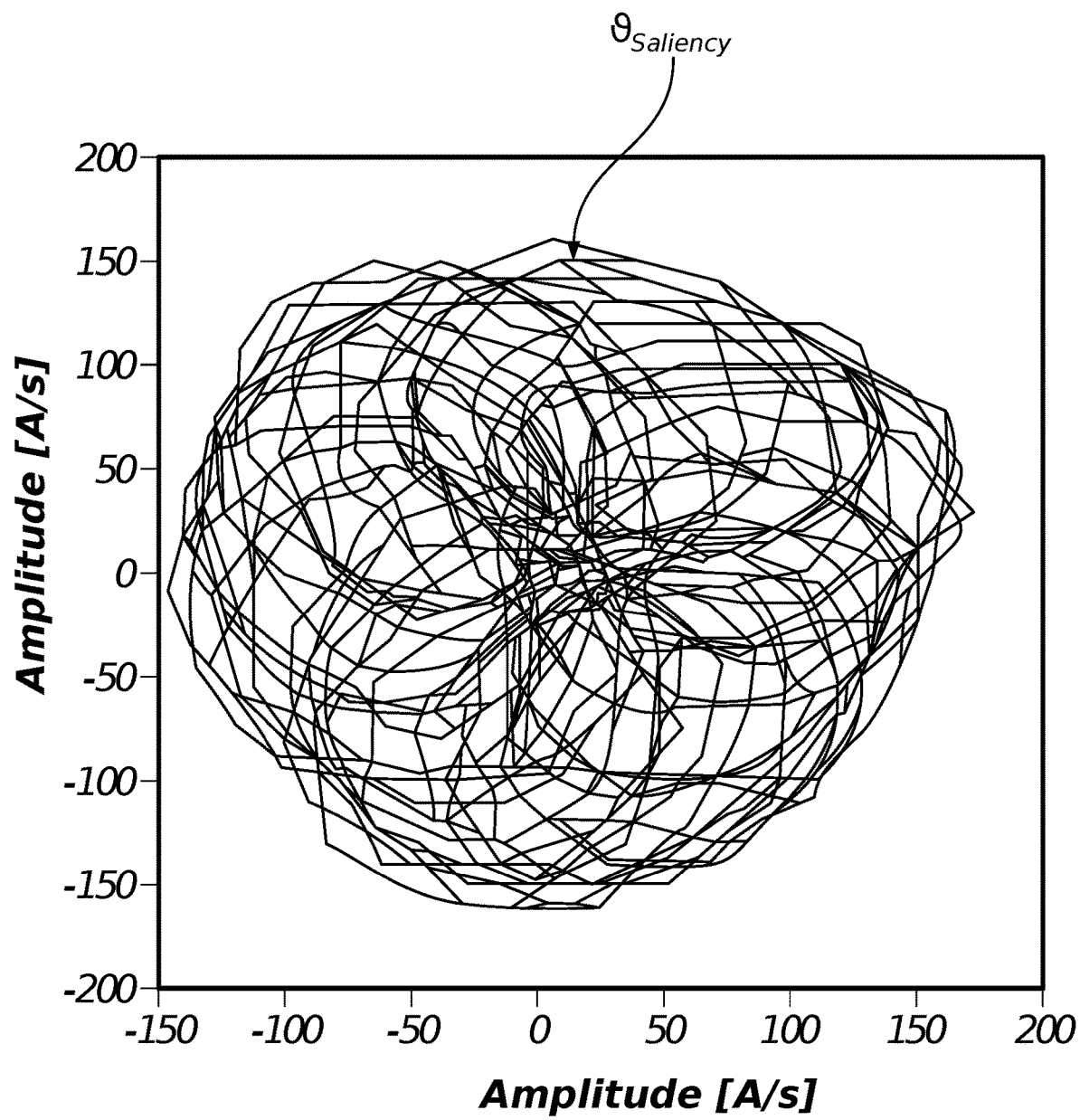
FIG. 4A shows a combined signal in the time domain, which was generated from a combination of current waveforms of all phase windings of the rotary current machine.

FIG. 4A shows the trace of the tensor $\vartheta_{Saliency}$, where both the abscissa and the ordinate represent an amplitude in amperes/second. The abscissa represents the real part and the ordinate the imaginary part of the signal $\vartheta_{Saliency}$.

Figure 4B:
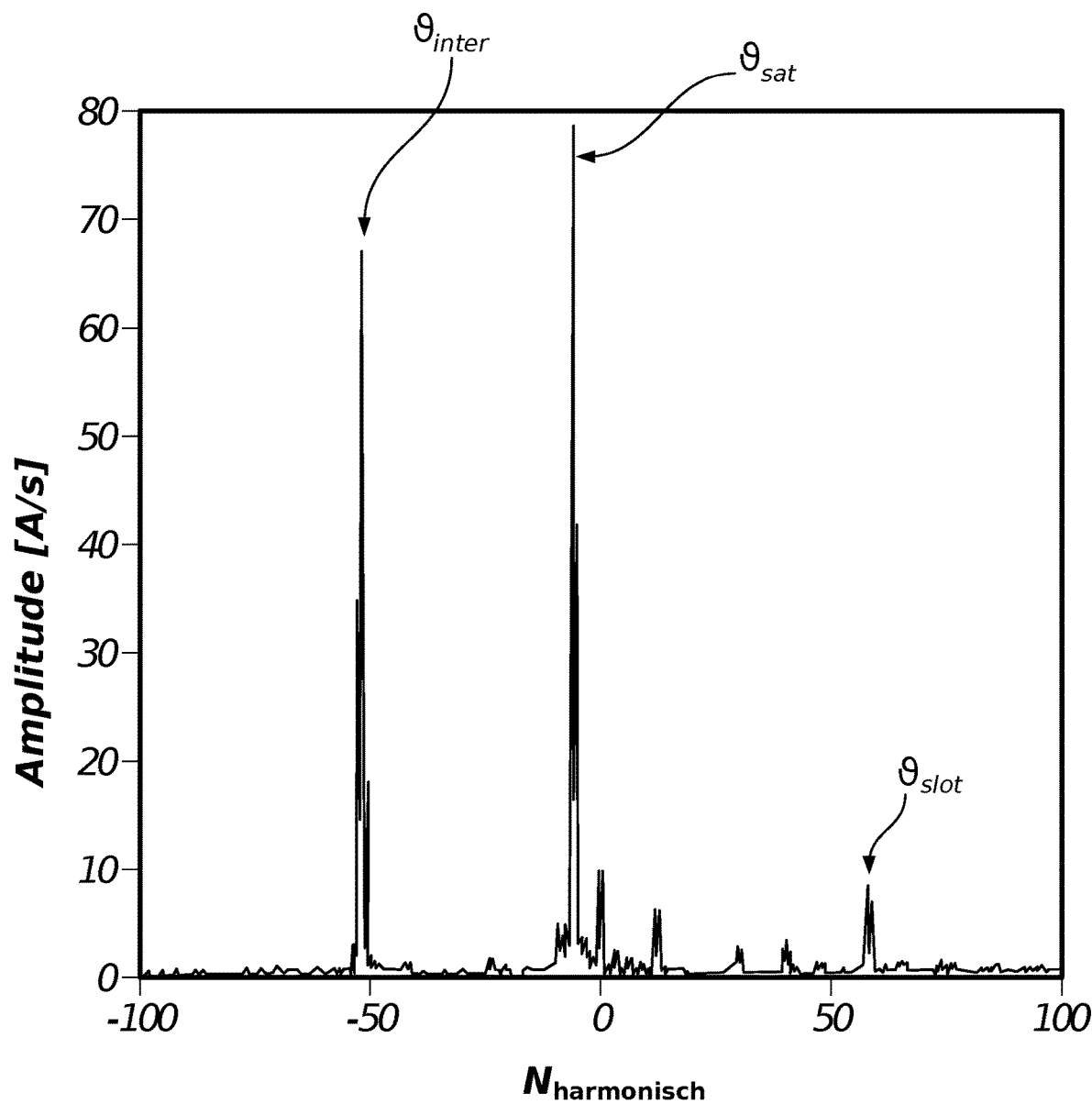
FIG. 4B shows the combined signal of FIG. 4A in the frequency domain.

FIG. 4B illustrates the signal $\vartheta_{Saliency}$ shown in FIG. 4A in the frequency domain, where the abscissa plots the harmonics $N_{harmonisch}$ of the signal. As can be seen in FIG. 4B, $\vartheta_{Saliency}$ contains three distinct signal components. A first prominent signal component is formed by a slot signal component $\vartheta_{slot}$, which is attributable to the slots 23 of the rotor 21 and of the stator 20 of the rotary current machine 3. A second prominent signal component is formed by a saturation signal component $\vartheta_{sat}$, which is attributable to the saturation of magnetic flux paths in the rotary current machine 3. A third significant signal component is formed by an intermodulation signal component $\vartheta_{inter}$, which is attributable to a physical interlinking of the slot signal component $\vartheta_{slot}$ and the saturation signal component $\vartheta_{sat}$. The slot signal component $\vartheta_{slot}$, the saturation signal component $\vartheta_{sat}$ and the intermodulation signal component $\vartheta_{inter}$ each having different fundamental frequencies.

In the prior art, in sensorless control using the slot information, the intermodulation signal component $\vartheta_{inter}$ and the saturation signal component $\vartheta_{sat}$ were previously eliminated as interference signals and the slot signal component $\vartheta_{slot}$ was used to determine an angular position and/or a rotation speed of the rotor. However, as can be seen in FIG. 4B, in the present case the slot signal component $\vartheta_{slot}$ is relatively small compared to other signal components. It can therefore be difficult to identify and extract the slot signal component $\vartheta_{slot}$, particularly at higher loads of the rotary current machine 3. In FIG. 4B, the slot signal component $\vartheta_{slot}$ already has approximately the same order of magnitude of higher harmonics as the saturation signal component $\vartheta_{sat}$.

According to the present teaching, it is therefore provided not to use the slot signal component $\vartheta_{slot}$ directly for controlling the rotary current machine 3, but to use the intermodulation signal component $\vartheta_{inter}$ and its indirectly included slot or rotor angle information for controlling the electric rotary current machine 2. The method according to the present teaching can be implemented in a control unit 12 (see FIG. 1). The intermodulation signal component $\vartheta_{inter}$ is a dominant signal component in the $\vartheta_{Saliency}$ signal over a wide rotation speed range and can therefore be easily identified. The present teaching is based on the finding that there is a relation between the fundamental frequency of the intermodulation signal component $\vartheta_{inter}$ and the fundamental frequency of the slot signal component $\vartheta_{slot}$, which allows information to be obtained about the angular position and/or rotation speed of the rotor 21. The relation can be described by equation (1):

$$\omega_{inter}=\pm\omega_{sat}-\omega_{slot}, \quad (1)$$

where $\omega_{inter}$ denotes the fundamental frequency of the intermodulation signal component $\vartheta_{inter}$, $\omega_{sat}$ the fundamental frequency of the saturation signal component $\vartheta_{sat}$, and $\omega_{slot}$ the fundamental frequency of the slot signal component $\vartheta_{slot}$. The sign of $\omega_{sat}$ depends on the design and construction of the rotary current machine 3.

In order to determine the angular position of the rotor, which can be used for controlling the rotary current machine 2, the intermodulation signal component $\vartheta_{inter}$ is separated from other signal components, i.e., essentially isolated, for example by filtering or estimating the unwanted signal components and subtraction. An angle $\theta_{inter}(t)$ is determined from the signal $\vartheta_{inter}$, in particular from its fundamental frequency. The angle can be a phase angle that changes over time. This can be carried out using a PLL (phase-locked loop), for example. In addition, an angle, in particular a phase angle, $\theta_{sat}(t)$ of the saturation signal component $\vartheta_{sat}$ is determined, in particular from its fundamental frequency. The two angles $\theta_{sat}(t)$ and $\theta_{inter}(t)$ are combined, for example, using the equation:

$$\theta_{slot}(t)=-\theta_{inter}(t)\pm\theta_{sat}(t), \quad (5)$$

to obtain a calculated angle $\theta_{slot}(t)$ of a slot angle. In this disclosure, $\theta$ is used to designate angles, while $\vartheta$ represents signals or signal components. The slot angle $\theta_{slot}(t)$ determined by equation (5) is essentially a calculated angle of the slot signal component $\vartheta_{slot}$. By dividing the slot angle $\theta_{slot}(t)$ by the number N of slots of the rotor, a mechanical angular position $\theta_{mech}(t)$ of the rotor 21 can be determined from $\theta_{slot}(t)$. $\theta_{mech}(t)$ can subsequently be used, for example, for controlling the rotary current machine 3. For example, $\theta_{mech}(t)$ can be used to represent electrical variables in a rotor-referenced coordinate system, or to control the angular position (angular position control) and/or the rotation speed (speed control) of the rotor.

Figure 5:
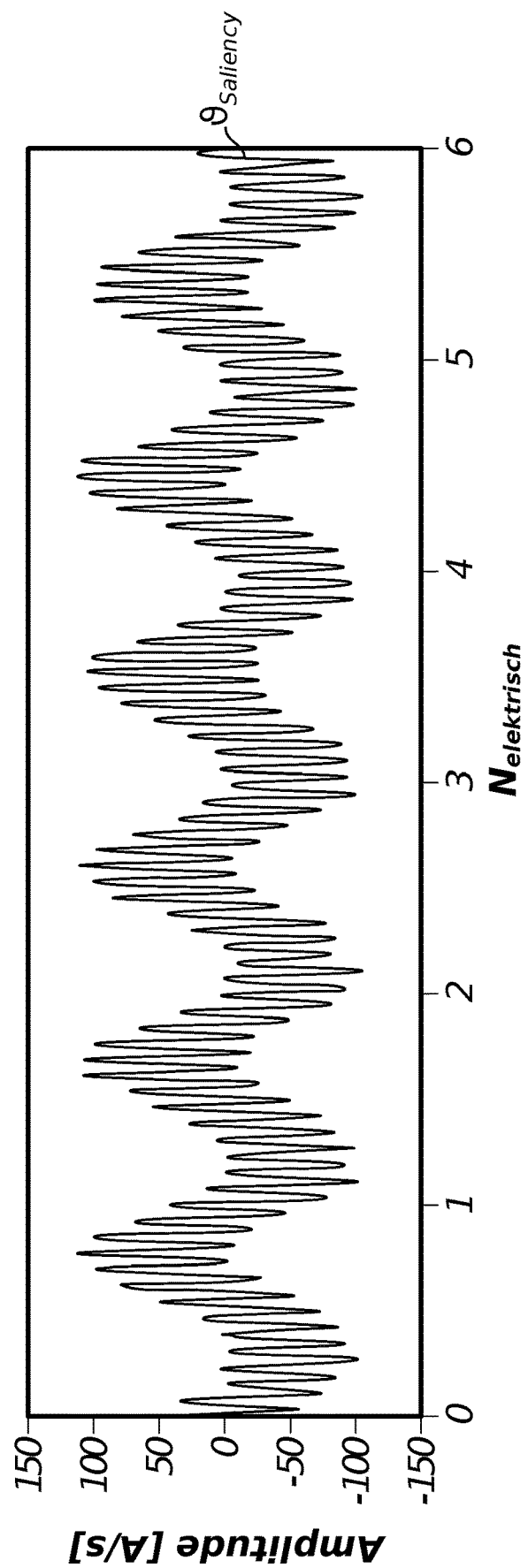
FIG. 5 shows a real component of the combined signal.

FIG. 5 shows a temporal waveform of the real component of the combined current signal $\vartheta_{Saliency}$ in seconds. This signal contains the slot signal component $\vartheta_{slot}$, the saturation signal component $\vartheta_{sat}$ and the intermodulation signal component $\vartheta_{inter}$.

Figure 6:
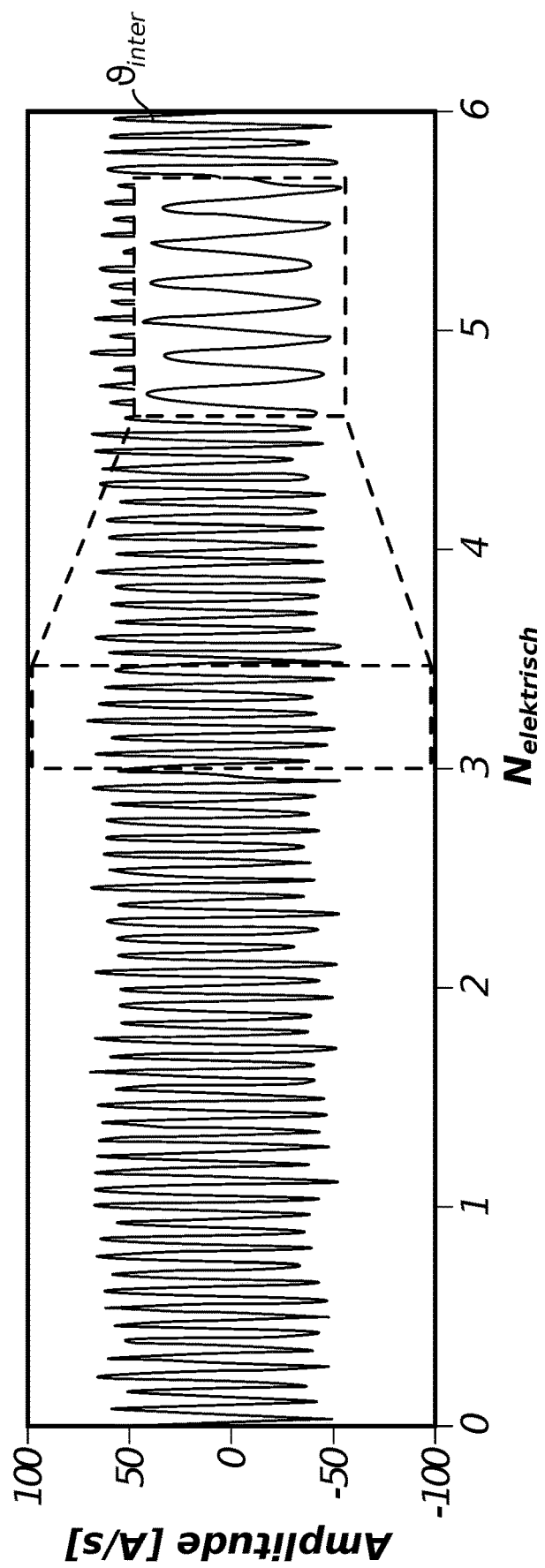
FIG. 6 shows a real component of an intermodulation signal component.

FIG. 6 shows a temporal waveform of the real part of the intermodulation signal component $\vartheta_{inter}$, in seconds, wherein the slot signal component $\vartheta_{slot}$ and the saturation signal component $\vartheta_{sat}$ have been eliminated. However, the signal shown still contains its own harmonics and those of other signal components.

Figure 7A:
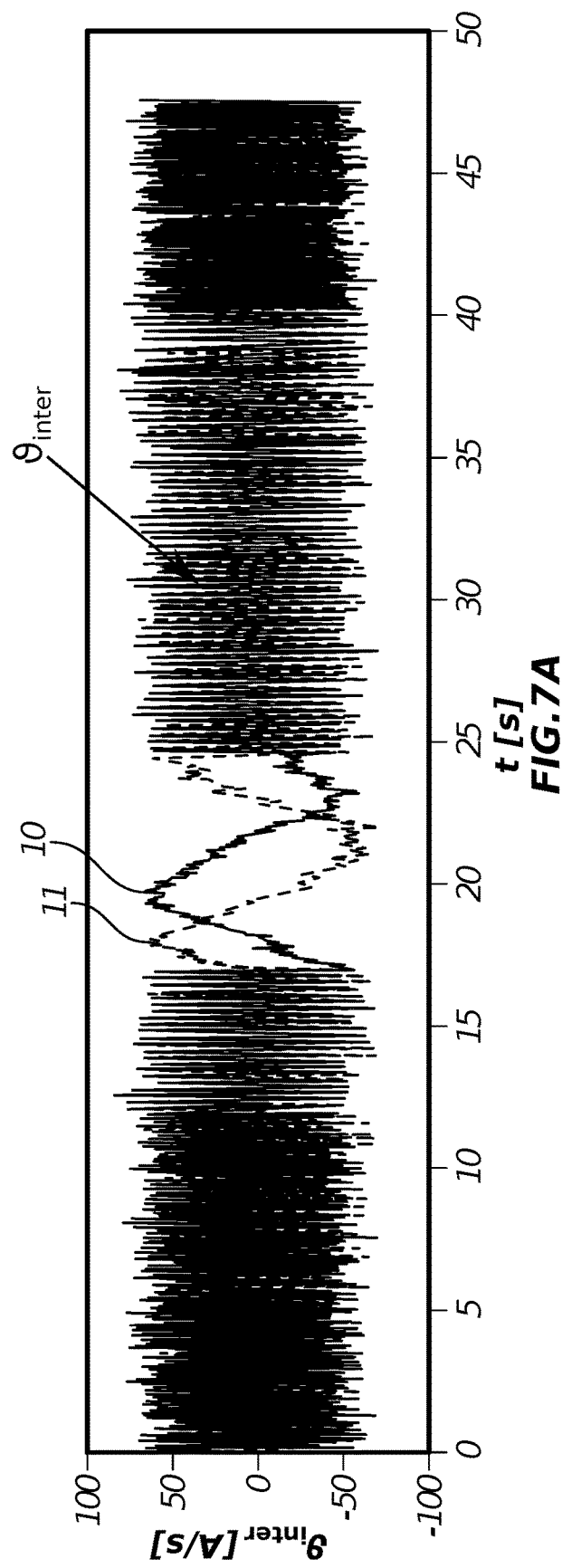
FIGS. 7A-7D show different signal waveforms of the rotary current machine in different operating states of the rotary current machine.
Figure 7B:
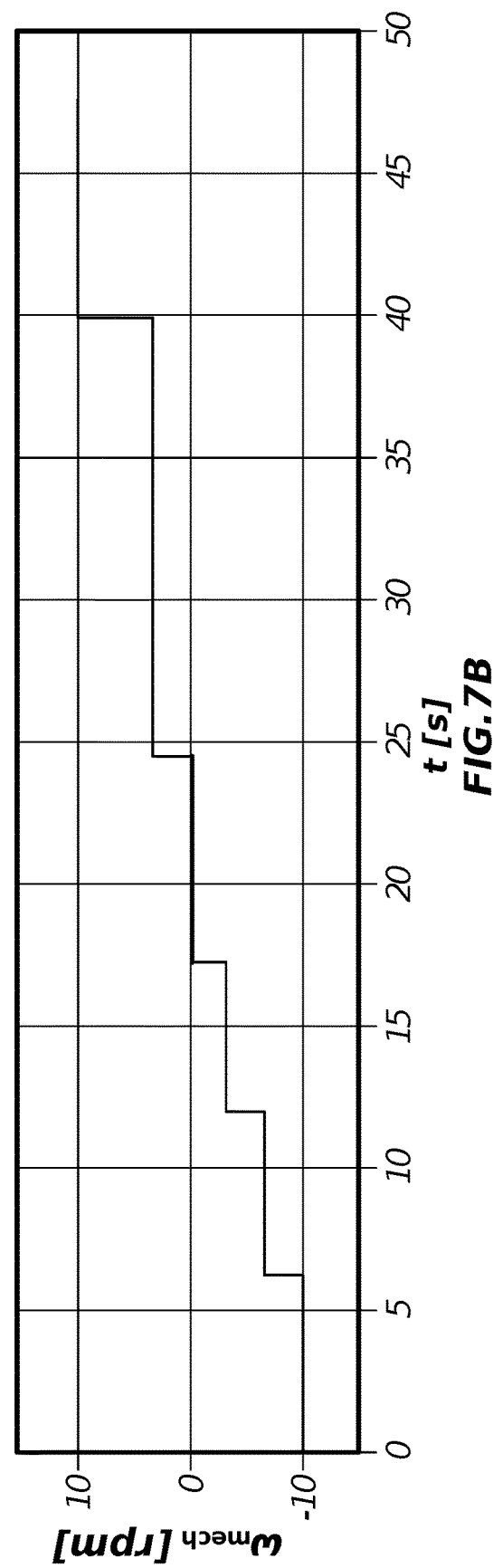
Figure 7C:
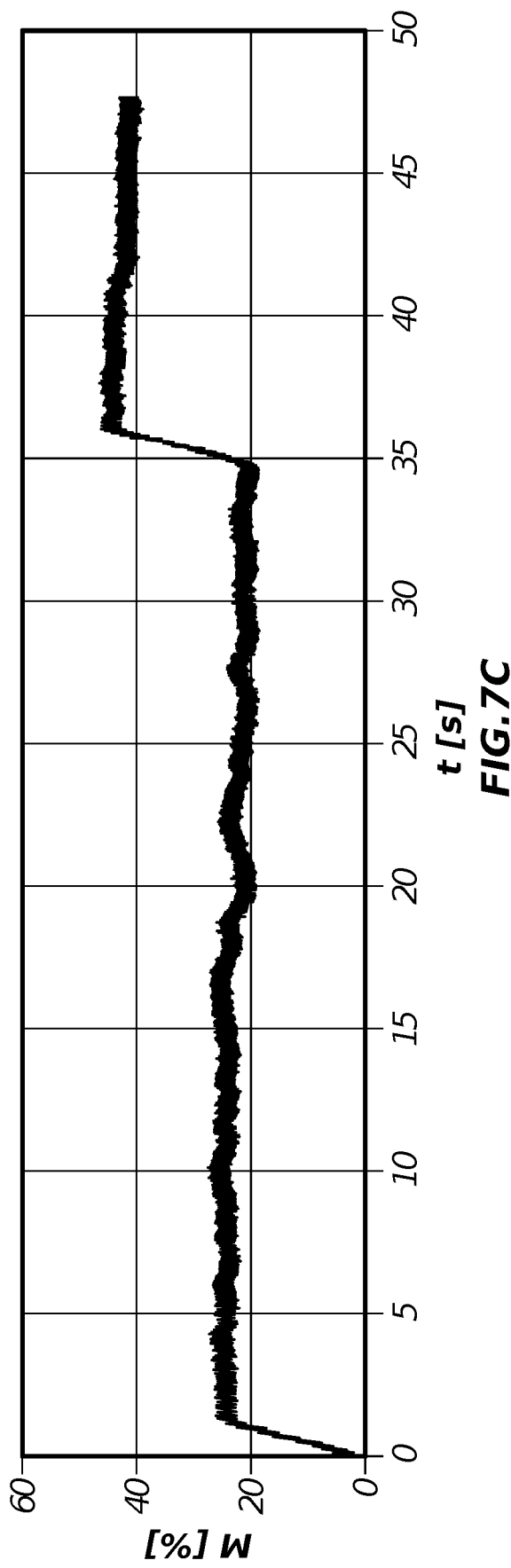
Figure 7D:
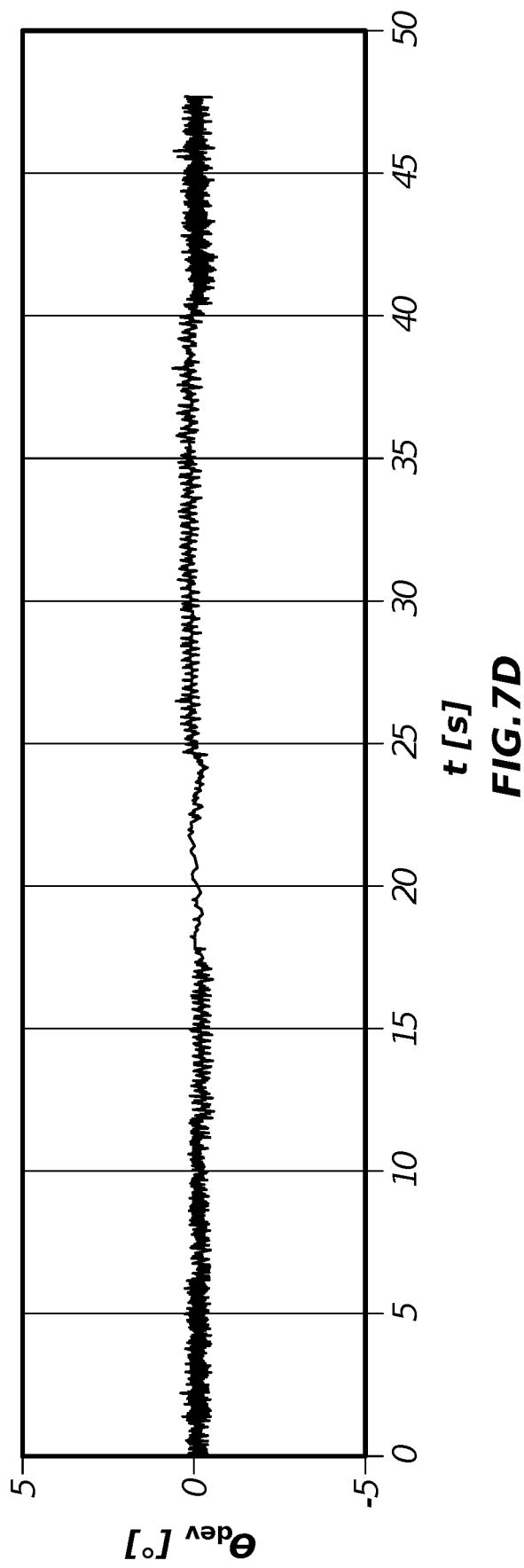

FIG. 7A-7D show signal waveforms for different operating states of the induction machine 2 at different times. The time t in seconds is plotted on the abscissa in all of the figures FIG. 7A-7D. FIG. 7A shows the real part 10 and the imaginary part 11 of the intermodulation signal component $\vartheta_{inter}$. FIG. 7B shows the mechanical rotation speed $\omega_{mech}$ of the rotor 21 in revolutions per minute (rpm) against time. FIG. 7C shows the torque generated by the rotary current machine 3 in relation to a nominal torque against time. FIG. 7D shows an angular deviation $\theta_{dev}$ between the mechanical angular position $\theta_{mech}(t)$ of the rotor, determined by means of the method according to the present teaching, and a mechanical angular position in degrees determined using a rotary encoder. In FIG. 7D it is apparent that the method according to the present teaching can be used to determine mechanical angular positions $\theta_{mech}(t)$ of the rotor which show a deviation from the actual (measured) mechanical angular position of less than 1°.

Figure 8A:
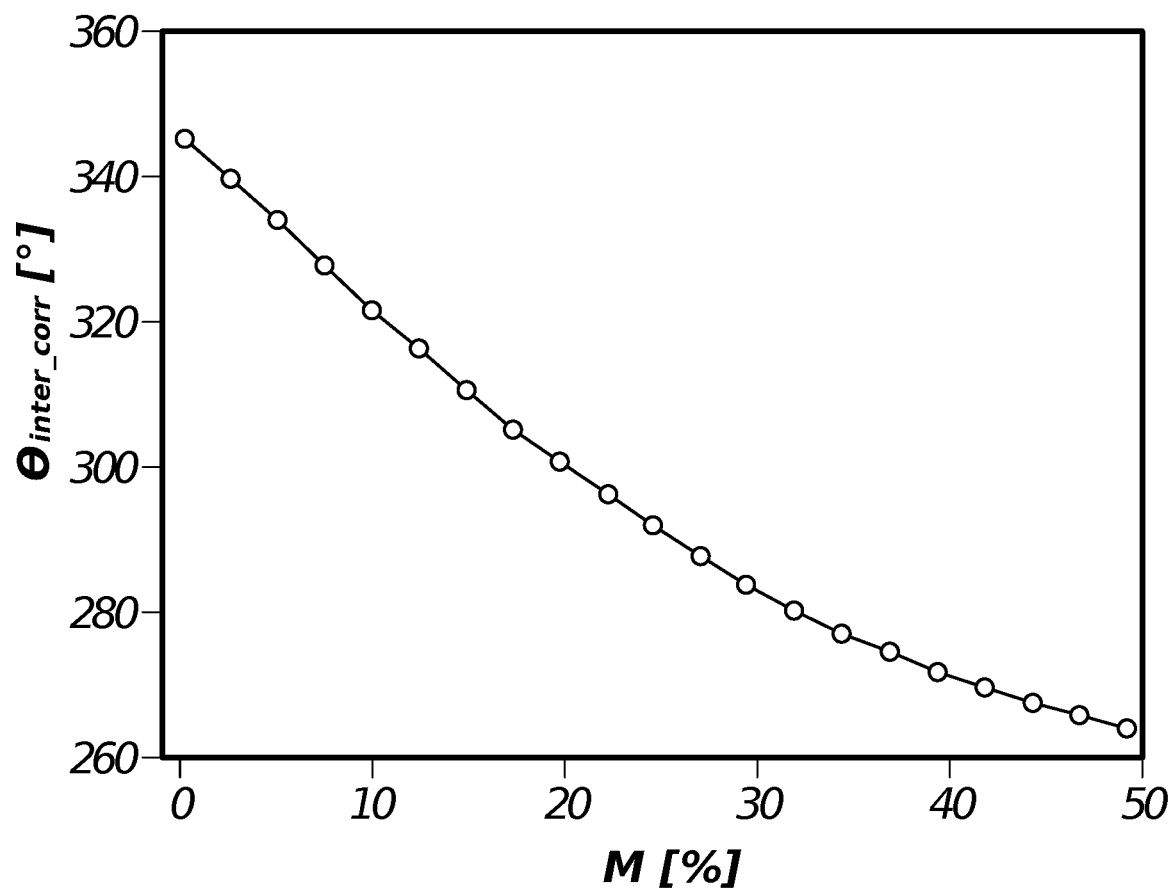
FIGS. 8A-8C each show waveforms of correction values.

Experiments have shown that the accuracy of the method according to the present teaching can be further increased by taking into account the dependencies of the angle $\theta_{inter}(t)$ of the intermodulation signal component $\vartheta_{inter}$ and the angle $\theta_{sat}(t)$ of the saturation signal component $\vartheta_{sat}$ on the rotation speed and/or load of the rotary current machine 3. It has been shown that the angle $\theta_{inter}(t)$ of the intermodulation signal component $\vartheta_{inter}$ and the angle $\theta_{sat}(t)$ of the saturation signal component $\vartheta_{sat}$ may show deviations as a function of the load, in particular of the torque M of the rotary current machine 3. In one embodiment, it can therefore be provided that the angle $\theta_{inter}(t)$ of the intermodulation signal component $\vartheta_{inter}$ is corrected as a function of the load of the rotary current machine 3, in particular the torque M, by means of an intermodulation correction value $\theta_{inter\_corr}$. The dependency of $\theta_{inter\_corr}$ on the torque M (in % relative to the rated torque) of the rotary current machine 3 is shown in FIG. 8A.

Figure 8B:
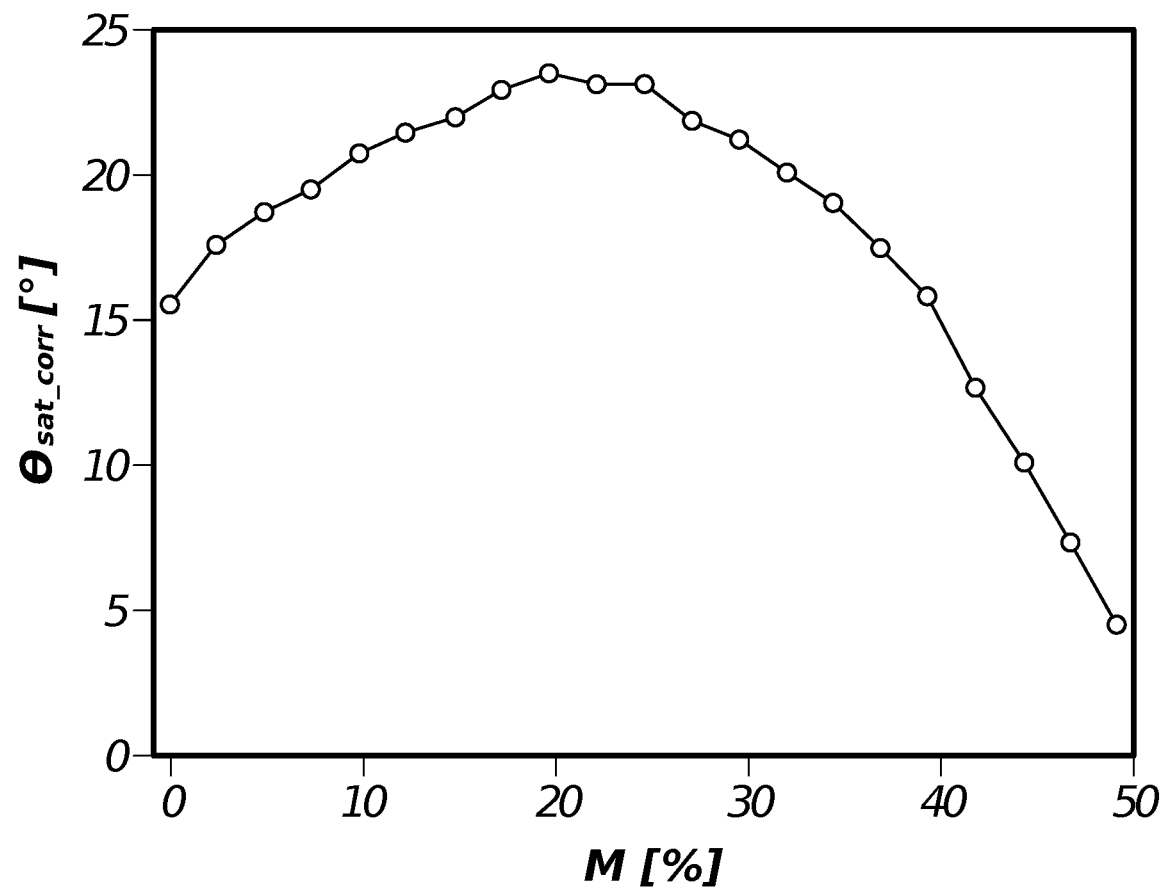

It can also be provided that the angle $\theta_{sat}(t)$ of the saturation signal component $\vartheta_{sat}$ is corrected as a function of the load and the rotation speed of the rotary current machine 3, in particular the torque M, by means of a saturation correction value $\theta_{sat\_corr}$. The dependency of $\theta_{sat\_corr}$ on the torque M (in % relative to the rated torque) of the rotary current machine 3 is shown in FIG. 8B.

Figure 8C:
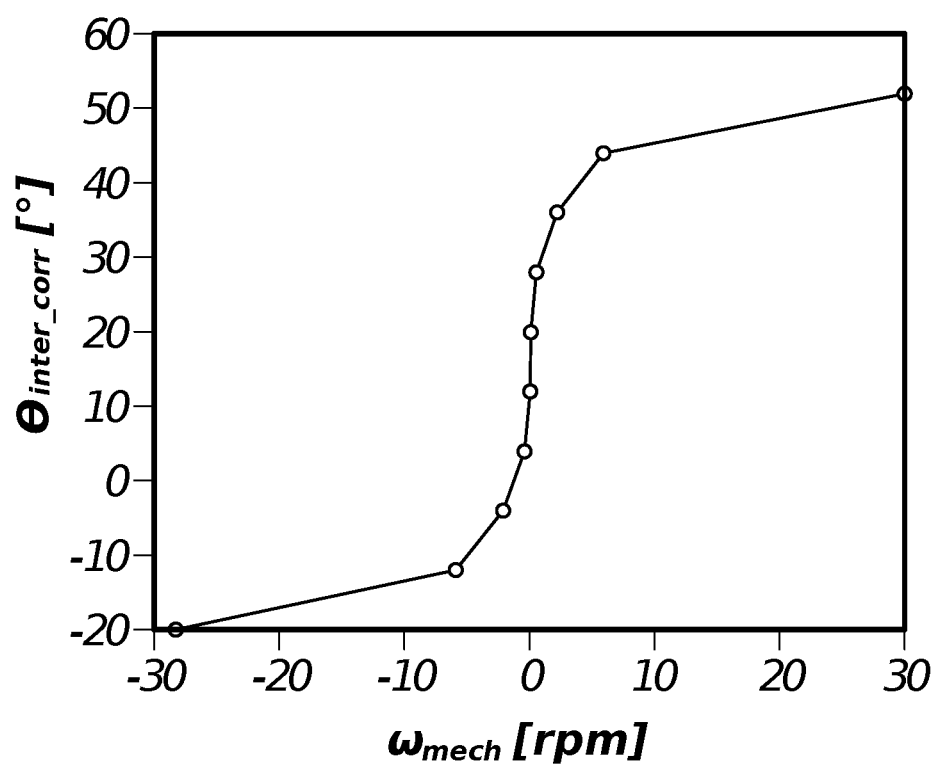

The angle $\theta_{inter}$ of the intermodulation signal component $\vartheta_{inter}$ may also be dependent on the rotation speed of the rotary current machine 3 (see FIG. 8C). This dependency can also be taken into account by means of the intermodulation correction value $\theta_{inter\_corr}$, in addition to or as an alternative to the torque dependency.

Figure 9:
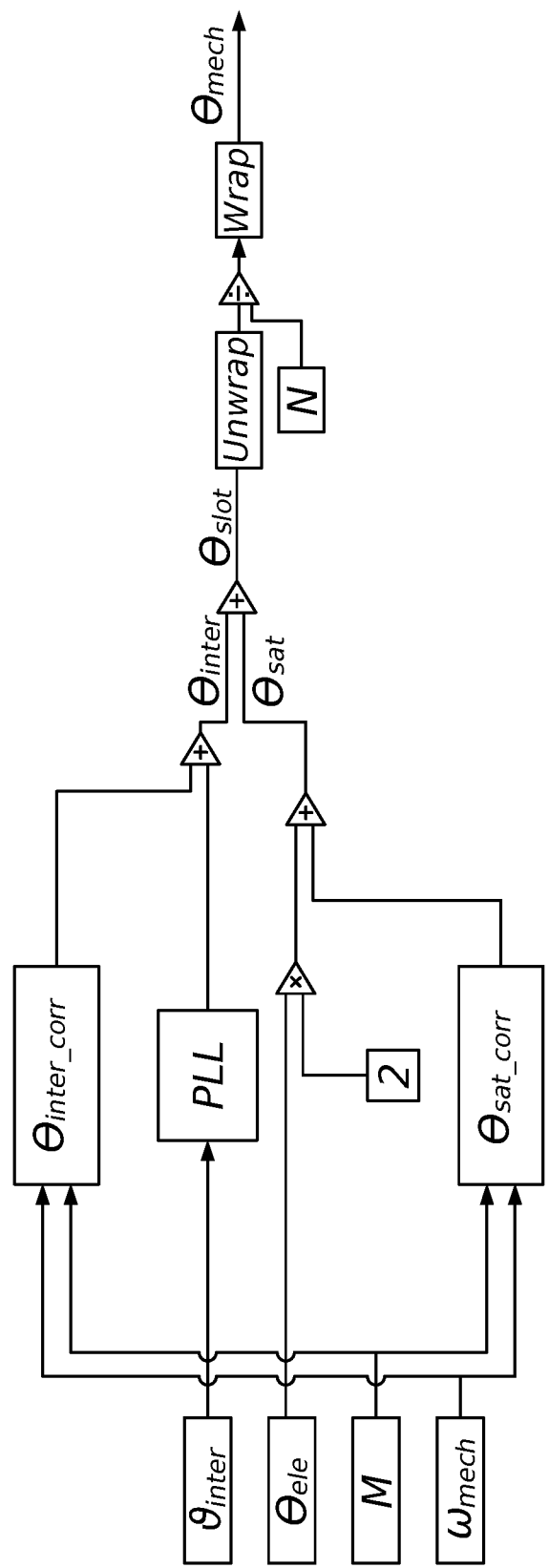
FIG. 9 shows a block circuit diagram as an example implementation of the present teaching.

FIG. 9 shows a schematic representation of a possible implementation of the method according to the present teaching. In the exemplary embodiment shown, the input variables used are the intermodulation signal component $\vartheta_{inter}$, an electrical angle $\theta_{ele}(t)$, a torque M and a mechanical angular velocity $\omega_{mech}$. $\theta_{ele}(t)$ represents the angle of the fundamental component of the stator current and can be determined from the measured phase currents $I_U$, $I_V$, $I_W$, for example as space vectors. $\omega_{mech}$ can be determined from the intermodulation signal component $\vartheta_{inter}$. By multiplying the electrical angle $\theta_{ele}(t)$, preferably by a factor of 2, the angle $\theta_{sat}(t)$ of the saturation signal component $\vartheta_{sat}$ can be obtained, which can be corrected by means of a previously determined saturation correction value $\theta_{sat\_corr}$. By means of a phase-locked-loop signal processing unit (PLL), the angle $\theta_{inter}(t)$ of the intermodulation signal component $\vartheta_{inter}$ can be obtained from the intermodulation signal component $\vartheta_{inter}$ and corrected by means of an intermodulation correction value $\theta_{inter\_corr}$. By combining the two angles $\theta_{inter}(t)$ and $\theta_{sat}(t)$, in particular using the equation (5), a slot angle $\theta_{slot}(t)$ can be calculated. The slot angle $\theta_{slot}(t)$ is calculated in an UNWRAP block to give a coherent angular path (unwrapped phase) and then divided by the number of slots N of the rotor to obtain a mechanical angular position $\theta_{mech}(t)$ of the rotor. The mechanical angular position can then be converted back again in a WRAP block so that $\theta_{mech}(t)$ is represented in an angular interval, in particular between [−180°;180°] or [0°;360°] (wrapped phase). $\theta_{mech}(t)$ can then be used for controlling the rotary current machine 3.

The invention claimed is:

1. A method for controlling an electric rotary current machine, with a rotor, a stator and at least two phase windings, wherein at least one electrical signal is applied to at least one phase winding of the rotary current machine and an electrical signal waveform in the at least one phase winding is measured or determined,
    wherein an intermodulation signal component caused by slotting effects and magnetic saturation effects in the rotary current machine, which intermodulation signal component is determined from the signal waveform determined or measured in the at least one phase winding, is used for controlling the rotary current machine,
    wherein a mechanical angular position and/or a rotation speed of the rotor is determined from the intermodulation signal component and the angular position and/or the rotation speed is used to control the rotary current machine.

2. The method according to claim 1, wherein the intermodulation signal component is determined from a rate of change of the signal waveform.

3. The method according to claim 1, wherein in at least two phase windings of the rotary current machine, current waveforms are determined and the current waveforms are combined by a mathematical equation to form a combined signal and the intermodulation signal component is determined from the combined signal.

4. The method according to claim 3, wherein the mathematical equation is an equation for calculating a tensor.

5. The method according to claim 1, wherein the intermodulation signal component is extracted by elimination of saturation signal components due to magnetic saturation effects in the rotary current machine and/or slot signal components due to slotting effects.

6. The method according to claim 5, wherein from an angle of the intermodulation signal component a slotting angle is determined by combining the angle of the intermodulation signal component with an angle of a saturation signal component contained in at least one signal waveform, using the calculation rule $$\theta_{slot}(t)=\pm\theta_{sat}(t)-\theta_{inter}(t).$$

7. The method according to claim 6, wherein a mechanical angular position of the rotor is determined by dividing the slotting angle by the number of slots of the rotor.

8. The method according to claim 6, wherein the angle of the intermodulation signal component is corrected by an intermodulation correction value as a function of the rotation speed of the rotor and/or the load on the rotary current machine.

9. The method according to claim 6, wherein the angle of the saturation signal component is corrected by a saturation correction value as a function of the rotation speed of the rotor and/or the loading on the rotary current machine.

10. The method according to claim 1, wherein the electrical signal comprises an excitation signal, which is essentially independent of the generation of a fundamental wave of the rotary current machine and the fundamental frequency of which is at least five times as great as a temporal frequency of the fundamental wave of the voltages in a phase winding for generating the fundamental wave of the rotary current machine.

11. The method according to claim 1, wherein the electrical signal is a current signal and the response of the rotary current machine to the current signal is evaluated to determine the intermodulation signal component.

12. A rotary current machine system, comprising:
  a rotary current machine having a rotor, a stator and at least two phase windings;
  a converter which is electrically connected to the rotary current machine, wherein the converter is configured to apply electrical signals to at least one phase winding of the rotary current machine;
  at least one measuring device which is configured to measure or determine at least one electrical signal waveform in the at least one phase winding;
  wherein:
  a control unit is provided that is configured to control the rotary current machine on the basis of an intermodulation signal component caused by slotting effects and magnetic saturation effects in the rotary current machine, which intermodulation signal component is contained in the at least one electrial signal waveform,
  wherein a mechanical angular position and/or a rotation speed of the rotor is determined from the intermodulation signal component and the angular position and/or the rotation speed is used to control the rotary current machine.

13. The System according to claim 12, wherein the control unit is integrated into the converter.

14. The system according to claim 12, wherein the intermodulation signal component is determined from a rate of change of the at least one electrical signal waveform.

15. The system according to claim 12, wherein in at least two phase windings of the rotary current machine, current waveforms are determined and the current waveforms are combined by a mathematical equation to form a combined signal and the intermodulation signal component is determined from the combined signal.

16. The system according to claim 12, wherein the intermodulation signal component is extracted by elimination of saturation signal components due to magnetic saturation effects in the rotary current machine and/or slot signal components due to slotting effects.

17. The system according to claim 16, wherein from an angle of the intermodulation signal component a slotting angle is determined by combining the angle of the intermodulation signal component with an angle of a saturation signal component contained in at least one signal waveform, using the calculation rule $$\theta_{slot}(t)=\pm\theta_{sat}(t)-\theta_{inter}(t).$$

18. The system according to claim 17, wherein a mechanical angular position of the rotor is determined by dividing the slotting angle by the number of slots of the rotor.

19. The system according to claim 12, wherein the electrical signals comprise an excitation signal, which is essentially independent of the generation of a fundamental wave of the rotary current machine and the fundamental frequency of which is at least five times as great as a temporal frequency of the fundamental wave of the voltages in a phase winding for generating the fundamental wave of the rotary current machine.

20. The system according to claim 12, wherein the electrical signals comprise a current signal and the response of the rotary current machine to the current signal is evaluated to determine the intermodulation signal component.

* * * * *